United States Patent [19]
Thomson et al.

[11] Patent Number: 5,213,346
[45] Date of Patent: May 25, 1993

[54] METHOD AND APPARATUS FOR SEALING BETWEEN TWO RELATIVELY ARTICULABLE SURFACES

[75] Inventors: William F. Thomson, Milford, N.H.; Calvin C. Chase, Dunstable, Mass.

[73] Assignee: Ingersoll-Rand Company, Woodcliff Lake, N.J.

[21] Appl. No.: 746,747

[22] Filed: Aug. 19, 1991

[51] Int. Cl.⁵ .......................... F16J 15/52; F16J 3/00; F16J 15/16

[52] U.S. Cl. .................. 277/237 R; 277/101; 277/181; 277/187; 277/189

[58] Field of Search ............... 277/5, 6, 7, 101, 181, 277/182, 185, 187, 189, 200, 237 R, 212 FB; 464/7, 173, 175; 285/225, 226, 235, 236; 74/18, 18.1, 18.2

[56] References Cited

U.S. PATENT DOCUMENTS

| | | | |
|---|---|---|---|
| 735,731 | 8/1903 | Draver | 277/164 |
| 777,345 | 12/1904 | Kennett | 162/331 |
| 1,982,445 | 11/1934 | Miquelon | 464/173 |
| 1,999,285 | 4/1935 | Davis, Jr. | 74/18.2 X |
| 2,025,635 | 12/1935 | Bishoff | 464/173 |
| 2,510,362 | 6/1950 | Anderson | 74/18.1 X |
| 2,895,467 | 7/1959 | Wallin | 277/185 |
| 3,460,856 | 8/1969 | Van Tine et al. | 285/236 X |
| 4,188,037 | 2/1980 | Abbes et al. | 277/180 X |
| 4,310,161 | 1/1982 | Streich | 277/121 X |
| 4,415,170 | 11/1983 | Bonafous | 277/163 |
| 4,449,742 | 5/1984 | Toerner et al. | 285/236 |
| 4,543,161 | 9/1985 | Fujimoto | 162/331 X |
| 4,557,491 | 12/1985 | Orain | 277/212 FB |
| 4,811,529 | 3/1989 | Harris et al. | 277/205 X |

FOREIGN PATENT DOCUMENTS

| | | | |
|---|---|---|---|
| 0685859 | 9/1979 | U.S.S.R. | 464/173 |
| 0853253 | 8/1981 | U.S.S.R. | 277/180 |
| 0943388 | 12/1963 | United Kingdom | 277/205 |
| 2158892 | 11/1985 | United Kingdom | 277/212 FB |

*Primary Examiner*—William A. Cuchlinski, Jr.
*Assistant Examiner*—James K. Folker
*Attorney, Agent, or Firm*—Robert F. Palermo

[57] ABSTRACT

A method and apparatus for sealing between relatively articulable surfaces is provided by folding a thin flexible sheet material to form a multilayer flattened elongated member. A large gap can be sealed, and seal installation and service life is improved by clamping a stiffened thickened portion of the seal member to each surface. Resulting avoidance of stress concentrations, combined with increased flexibility attributable to its multilayer construction, contributes significantly to improved installation and service performance of the seal.

10 Claims, 2 Drawing Sheets

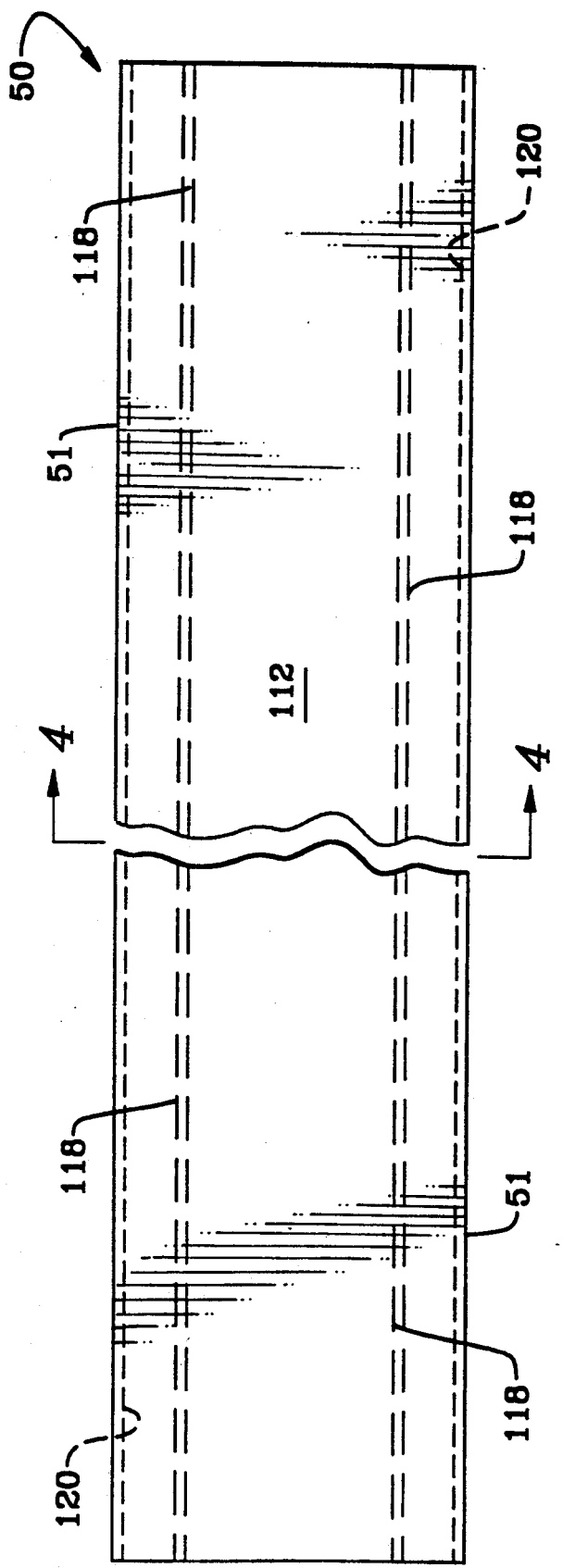
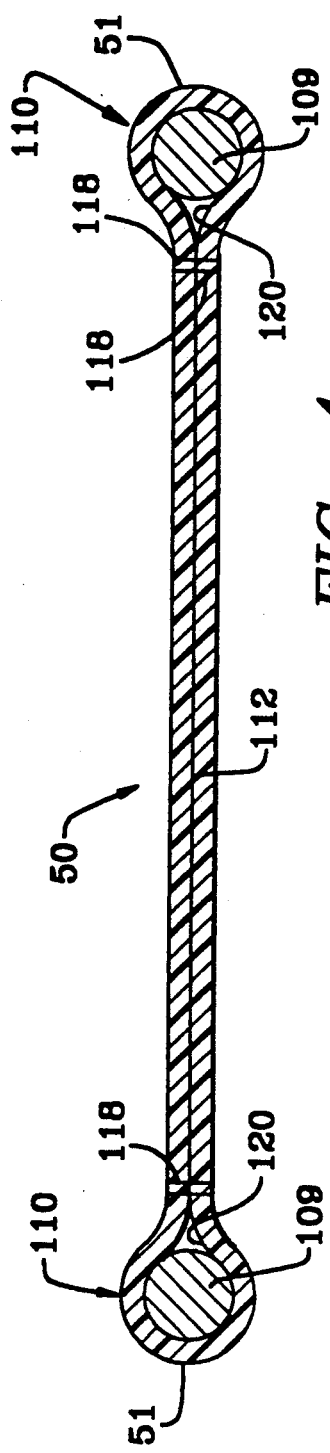
FIG. 3
FIG. 4

METHOD AND APPARATUS FOR SEALING BETWEEN TWO RELATIVELY ARTICULABLE SURFACES

BACKGROUND OF THE INVENTION

This invention relates generally to sealing between two relatively articulable surfaces and more particularly to sealing between a stationary vat wall and an articulating baffle.

In processing of wood pulp for papermaking, various washing and filtering operations are required. In these and other operations, it is necessary to separate fluids having different levels of contamination or different concentrations. Frequently, this will require a long seal across a substantial gap between two parallel relatively articulable surfaces, e.g., separating pulp slurry from washing liquid contained on opposite sides of a pressure filter stationary housing wall and a cooperating articulable compaction baffle member.

Commonly, this type of seal is made by attaching a piece of elastomeric material to and between the two relatively articulable surfaces. The seal dimensions and configuration are important factors in providing necessary flexing, differential pressure resistance, differential expansion load bearing, and longitudinal joint sealing and attachment stiffness; the materials of construction must be resistant to chemical attack and flexing. In addition, because of the magnitude of the length of the seal, and the relative variations in gap, joint surface, and parallelism, the temperature, the pressure, and the relative motion between the two surfaces; the elastomeric material must be quite thick—often ⅜" or more. Repeated flexure of a thick member results in high surface stresses due to the distance of the surfaces from the neutral axis of the flexible member. Such high stresses often result in premature tearing and splitting of the seal and/or failure of the fixing, holding, and/or seal clamping mechanism. In addition, fluid pressure, temperature, and chemical activity, as well as local extremes of stress due to non-uniform (or kinked) flexure shorten the service life of the seal member. Seal failure may result in degradation of pulp cleanliness and resultant quality due to premature intermixing of pulp slurry with wash liquid through the broken seal. Tearing/splitting failures can result in pieces of the elastomeric seal material being discharged to further processes such as paper making where such material will detrimentally affect the paper machine components and/or result in non-salvable paper. Seal replacement requires shutdown of the equipment and its attendant production loss.

The foregoing illustrates some of the limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a seal device comprising a fluid resistant sheet folded repeatedly about itself to form a multilayer flat elongated sealing member having a web bounded by longitudinal pockets together with provisions insertable in the pockets of the sealing member for stiffening and thickening elongated edges of the sealing member.

The foregoing and other aspects will become apparent from the following detailed description of the invention when considered in conjunction with the accompanying drawing figures.

BRIEF DESCRIPTION OF THE DRAWINGS

FIG. 3 is a plan view of a preferred embodiment of the elongated flexible seal member; and FIG. 4 is an elevation view from line 4—4 of FIG. 3 of the preferred embodiment of the sealing device of the present invention.

DETAILED DESCRIPTION

Figure 1:
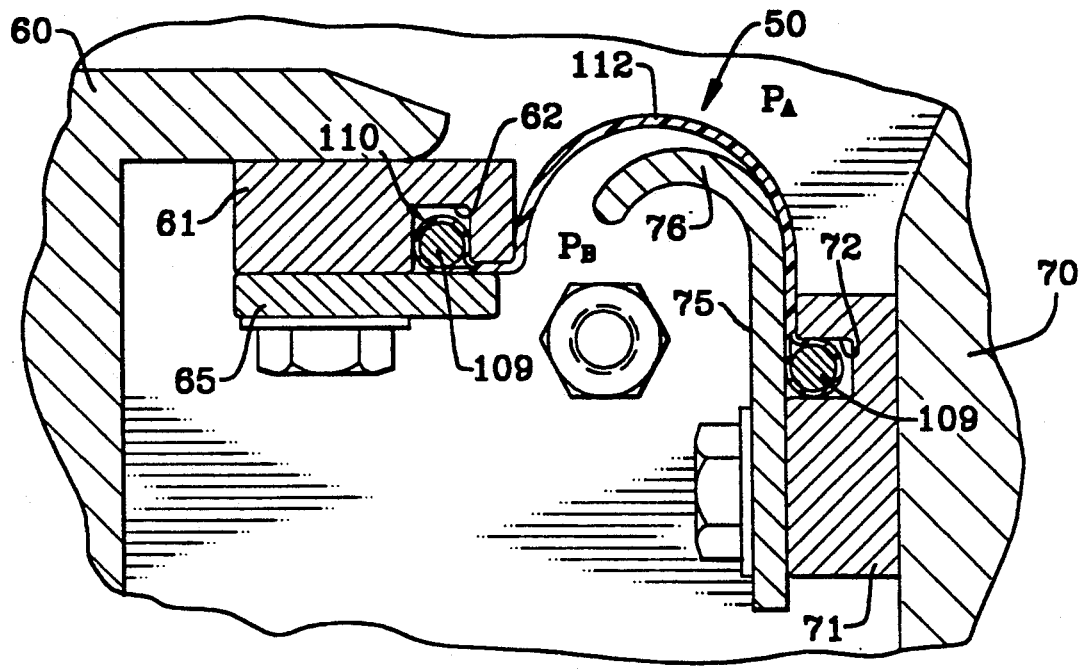
FIG. 1 is a fragmentary schematic cross sectional view of a seal, according to the present invention, between two relatively articulable surfaces.

Referring to FIGS. 1 through 4, two relatively articulable surfaces 60 and 70 can be seen. Surface 60 has a seal adapter 61, and surface 70 has a seal adapter 71, both of which are attached to their respective surfaces by welding or other fluid tight means. Sealing device 50 stretches between seal adapter 61 and seal adapter 71 and is connected to (clamped in) the adapters using clamping plates 65 and 75, respectively. Groove 62 in seal adapter 61 and groove 72 in seal adapter 71 permit fluid tight clamping of sealing device 50 without the necessity for penetration of the seal by bolts or other fastening members.

Figure 2:
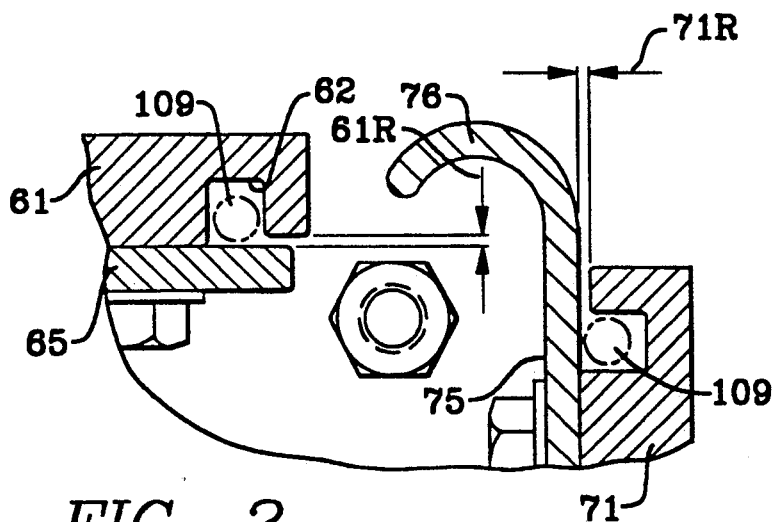
FIG. 2 is a view showing further detail of the seal clamping mechanism shown in FIG. 1.

In its preferred embodiment, the flat sealing member 50 of the present invention is provided with a pocket 120, along each longitudinal edge 51, into which a rod 109 can be inserted to create a stiffened and thickened portion 110 along each longitudinal edge. When placed in grooves 62 and 72 and covered with clamp plate 65 and clamp plate 75, these thickened portions 110 prevent sealing member 50 from being pulled loose from surfaces 60 and 70. FIG. 2 shows further detail of clamp relief 61R and 71R on seal adapter 61 and 71, respectively, which, acting with clamp plates 65 and 75, provide non-pinching retention of the sealing member 50 between the two articulable surfaces. This relief is provided by cutting back the jointward surface of seal adapters 61 and 71 to provide a clearance, with clamp plates 65 and 75, equal to the thickness of seal web 112 of seal member 50. In addition to the non-pinching clearance relief, seal adapters 61 and 71 have generous radii on their groove edges in order to provide maximum contact area as well as the smoothest directional transition possible. Clamp plate 75 has an anti-kink stay 76 which is designed to control the direction of folding of web 112 of seal member 50 when articulation takes place between surfaces 60 and 70. This assures that all layers of the multilayer seal member will always flex uniformly along its total length, and that there will be no wrinkles or other non-uniform flexure of the seal.

FIGS. 3 and 4 show some detail of construction of the preferred embodiment of the seal member of the present invention. It is preferred to take a wide sheet of fluid resistant fabric or other fluid resistant sheet and, by folding the fabric repeatedly about itself, to form a long multilayer tubular body. The body is flattened and at least one row of stitching or other retaining provision is run longitudinally along the flattened tubular body to form a pocket 120 along each longitudinal edge 51. In the preferred embodiment two rows of stitching 118 are used to provide pockets 120 while retaining a seal web 112 free of stitches so that the several layers are free to move in the same direction independently of one another. When rods 109 are inserted into pockets 120, thus formed, the stiffened and thickened portion 110 is formed along each longitudinal edge 51 of sealing member 50 as seen in FIGS. 3 and 4. Considering the views shown in FIGS. 1 through 4, it is readily apparent that the individual layers of flexible sheet which make up the multilayer elongated seal member 50 are subjected, when properly clamped according to the present invention, to virtually pure tensile loading. This is so because of the circular cross section of rods 109, the generous radii of seal adapters 61 and 71 next to grooves 62 and 72 and the pinch avoiding clamp reliefs 61R and 71R. All of these features combine to avoid pinching or cutting loads which could be imposed by sharp edges or tight clamp fits. Another stress reduction provision is the loose multilayer structure of sealing web 112. This permits the minute differences in magnitude of flexure necessary to reduction of surface stress peaks caused by distance from the netural axis of the seal web. Note that, in most cases, there is no tensile stress on the sealing member. However, during flexing, the outer layers of the multilayer sealing member 50, due to its overall thickness, will experience a degree of tensile or compressive stress.

Another stress avoidance feature of the present invention is the curved anti-king stay 76 shown in FIGS. 1 and 2 as a portion of clamp plate 75. This stay prepositions the sealing device 50 by prebending seal web 112 to produce a deflection which establishes the direction of flexure of sealing member 50 in response to articulation between surfaces 60 and 70. This eliminates the danger of kinking as might occur in one or more layers if web 112 of sealing member 50 were not supported by stay 76. In addition, the curved anti-kink stay 76 prevents the seal 50 from being forced undesirably through the gap between seal adapters 61 and 71 in situations where pressure $P_A$ is greater than $P_B$. Such forced movement, in addition to kinking seal 50, would create an undesirable pocket for pulp slurry on the pressure $P_A$ side of the seal.

The preferred material for construction of sealing member 50 is a thin tightly woven fabric of polytetrafluoroethylene. This provides excellent chemical resistance, resistance to fluid leakage, and flexibility. Depending upon the specific application, different materials of construction may be used. Selection is based on considerations of cost, chemical environment, and mechanical constraints.

The preferred embodiment for construction of seal member 50, as shown in FIG. 4, consists of a flat multilayer tube with one or more longitudinal rows of stitches 118 to form a pocket along each longitudinal edge 51. A rod 109 is installed in each pocket 120 to form stiffened and thickened portion 110 which is used for clamping the seal into grooves 62 and 72 of seal adapters 61 and 71, respectively.

What is claimed is:

1. A seal device for sealing a substantially straight linear gap between two relatively articulable substantially planar and parallel surfaces, comprising:
    a fluid resistant sheet folded repeatedly about itself to form a multilayer flat elongated sealing member having a web bound by longitudinal pockets formed along two parallel edges of said sealing member; and
    means insertable in said sealing member longitudinal pockets for both stiffening and thickening the parallel edges of said sealing member and for cooperating with grooves in said substantially planar surfaces adapted to receive the stiffened and thickened edges of said flat sealing member.

2. The seal device of claim 1, wherein the means for both stiffening and thickening the parallel edges of said sealing member comprise two elongated rods for insertion into said pockets, one said rod along each longitudinal edge.

3. The seal device of claim 1, further comprising clamping means for securing the stiffened and thickened edges of said sealing member in said grooves.

4. The seal device of claim 3, wherein the clamping means further comprises at least one anti-kink stay in contact with said sealing member.

5. The seal device of claim 3, wherein the clamping means further comprises a rigid plate.

6. The seal device of claim 5, wherein a relief means is provided between a portion of the rigid plate and each said grooved relatively articulable surface for positively clamping without crushing or pinching the web and edges of the multilayer sealing member.

7. A method for forming a fluid tight seal of a substantially straight linear gap between two relatively articulable substantially planer and parallel surfaces, comprising:
    providing a thin flexible sheet member having strength, chemical resistance, and limited fluid permeability;
    folding said sheet member repeatedly over itself to form a flat multilayer elongated sealing member;
    stiffening and thickening the parallel longitudinal edges of said sealing member; and
    securing the parallel longitudinal edges of said flat multilayer sealing member in a fluid tight relationship to the relatively articulable substantially parallel planar surfaces.

8. The method of claim 7, further comprising securing a medial longitudinal portion of said sealing member to form two longitudinal parallel pockets therein joined by a flexible web.

9. The method of claim 8, wherein the parallel longitudinal edges of said flat elongated sealing members are secured to the relatively articulable planar surfaces by two rod members inserted within said pockets, said inserted rod members being clamped by a rigid plate one each in a groove in each substantially planar surface.

10. In a machine, for washing and filtering wood pulp, of the type having a stationary housing wall to which a cooperating compaction baffle member is articulably connected; said compaction baffle member having the dual functions of compacting a pulp mat formed on a porous surface of a filter member to enhance extraction of contaminated liquor and also acting as a barrier to prevent intermixing between contaminated pulping liquor and relatively clean washing liquor; the improvement, in combination with said housing wall and said compaction baffle member, comprising:
    a seal device for sealing a substantially straight linear gap between substantially parallel planar surfaces of said stationary housing wall and said compaction baffle member, said seal device comprising:

a fluid resistant sheet folded repeatedly about itself to form a multilayer flat elongated sealing member having a web bounded by longitudinal pockets formed along two parallel edges of said sealing member; and means insertable in said sealing member longitudinal pockets for both stiffening and thickening the parallel edges of said sealing member; and for cooperating with grooves in said substantially planar surfaces adapted to receive the stiffened and thickened edges of said flat sealing member.

* * * * *